United States Patent
Thurnheer

(10) Patent No.: US 11,230,687 B2
(45) Date of Patent: Jan. 25, 2022

(54) DEVICE AND METHOD FOR PRODUCING A DEALCOHOLIZED BEVERAGE

(71) Applicant: WIA WINE AG, Berneck (CH)

(72) Inventor: Alfred Thurnheer, Berneck (CH)

(73) Assignee: WIA WINE AG, Berneck (CH)

( * ) Notice: Subject to any disclaimer, the term of this patent is extended or adjusted under 35 U.S.C. 154(b) by 356 days.

(21) Appl. No.: 15/109,605

(22) PCT Filed: Jan. 9, 2015

(86) PCT No.: PCT/EP2015/050298
§ 371 (c)(1),
(2) Date: Jul. 1, 2016

(87) PCT Pub. No.: WO2015/104357
PCT Pub. Date: Jul. 16, 2015

(65) Prior Publication Data
US 2016/0326473 A1    Nov. 10, 2016

(30) Foreign Application Priority Data

Jan. 10, 2014   (EP) .................................... 14150715

(51) Int. Cl.
*C12G 3/08*       (2006.01)
*C12H 3/04*       (2019.01)
(Continued)

(52) U.S. Cl.
CPC .................. *C12H 3/04* (2019.02); *A23L 2/38* (2013.01); *A23L 5/273* (2016.08); *B01D 3/002* (2013.01);
(Continued)

(58) Field of Classification Search
CPC .. B01D 61/027; B01D 61/022; B01D 15/203; B01D 15/10; B01D 3/145; B01D 3/002; C12G 3/085; A23L 5/273; A23L 2/38
See application file for complete search history.

(56) References Cited

U.S. PATENT DOCUMENTS 4,681,767 A * 7/1987 Weiss ...................... C12G 3/085
426/14
4,812,232 A * 3/1989 Weiss ...................... C12G 3/085
210/181
(Continued)

FOREIGN PATENT DOCUMENTS

CN       1373181 A    10/2002
CN     102586021 A     7/2012
(Continued)

OTHER PUBLICATIONS

Bogianchini M et al: Stability, antioxidant activity and phenolic composition of commercial and reverse osmosis obtained dealcoholised wines:, LWT—Food Science and Technology, Acedemic Press, United Kingdom, Bd. 44, Nr. 6.
(Continued)

*Primary Examiner* — Vera Stulii
(74) *Attorney, Agent, or Firm* — David A. Jones; Alpine IP PLLC

(57) ABSTRACT

Producing a dealcoholized beverage from its alcoholic beverage starting product and plant for implementing the method, which comprises the following steps: separating the beverage starting product into an alcoholic and aromatic permeate and into an aromatic and almost alcohol-free retentate in a permeation module by non-thermal permeation, dealcoholizing the permeate in a module intended for that task, and finally mixing the dealcoholized permeate with the almost alcohol-free retentate in a final-mixing module. Prior to the dealcoholizing, aroma compounds are (Continued)

removed from the aromatic and alcoholic permeate by cold adsorption in an aroma adsorber, resulting both in an aroma phase and in an aroma-free but alcoholic permeate which, however, has the alcohol removed from it by alcohol separation, resulting in an aqueous, largely dearomatized and dealcoholized permeate water phase. Final mixing of aroma phase, permeate water phase and retentate takes place in the final-mixing module to give a dealcoholized beverage.

14 Claims, 3 Drawing Sheets

(51) Int. Cl.
    *B01D 61/02*     (2006.01)
    *A23L 5/20*     (2016.01)
    *A23L 2/38*     (2021.01)
    *B01D 3/00*     (2006.01)
    *B01D 3/14*     (2006.01)
    *B01D 15/10*     (2006.01)
    *B01D 15/20*     (2006.01)

(52) U.S. Cl.
    CPC ............. *B01D 3/145* (2013.01); *B01D 15/10* (2013.01); *B01D 15/203* (2013.01); *B01D 61/022* (2013.01); *B01D 61/027* (2013.01); *A23V 2002/00* (2013.01); *B01D 2311/25* (2013.01); *B01D 2311/2626* (2013.01); *B01D 2311/2669* (2013.01); *B01D 2317/025* (2013.01)

(56) References Cited

U.S. PATENT DOCUMENTS

| | | | |
|---|---|---|---|
| 4,963,381 A | * | 10/1990 | Girard .................... C12G 3/085 426/490 |
| 5,308,631 A | | 5/1994 | Anglerot |
| 6,472,009 B1 | | 10/2002 | Berrebi et al. |
| 2007/0039882 A1 | * | 2/2007 | Da Silva Goncalves .................... B01D 61/027 210/636 |
| 2008/0272041 A1 | | 11/2008 | Wollan |
| 2010/0047422 A1 | * | 2/2010 | Magalhaes Mendes .. A23L 2/56 426/494 |

FOREIGN PATENT DOCUMENTS

| | | |
|---|---|---|
| DE | 35 06 820 A1 | 8/1986 |
| DE | 102010031729 A1 | 6/2011 |
| WO | 89/01965 A2 | 9/1989 |
| WO | 93/22036 A1 | 11/1993 |
| WO | WO 92/08783 * | 5/1995 |
| WO | 2004/113489 A1 | 12/2004 |

OTHER PUBLICATIONS

Karlsson H: "Aroma recovering during beverage processing", Journal of Food Engineering, Barking, Essex, GB, Bd. 34, Nr. 2, 1997, pp. 159-178, XP002112611, ISSN: 0260-8774, DOI: 10.1016/S0260-8774(97) 00081-2 pp. 173-175.

PCT/EP2015/050298 International Preliminary Report On Patentability (Chapter I of the Patent Cooperation Treaty) WIA Wine AG.

English Translation of PCT/EP2015/050298 International Preliminary Report on Patentability (Chapter I of the Patent Cooperation Treaty) WIA Wine AG.

* cited by examiner

DEVICE AND METHOD FOR PRODUCING A DEALCOHOLIZED BEVERAGE

FIELD OF THE INVENTION

The application relates to a device and a method for producing a dealcoholized beverage, with a dealcoholization being understood as meaning any reduction in the alcohol content of a beverage ranging to complete removal of the alcohol. Hereinbelow, alcohol is understood as meaning ethanol.

BACKGROUND

In principle, it is possible to distinguish between two methods for dealcoholization, with combinations of these two methods also being known. In the one method, a low alcohol content is achieved by stopping the fermentation prematurely, i.e. the formation of alcohol is prevented or reduced. As a result, the beverage generally acquires a sweet taste since many carbohydrates are still present in their original form. By contrast, aromas which only develop during the fermentation are lacking. In the other method, after the fermentation process has finished, the alcohol is removed from the beverage in a downstream physical process, during which many aroma substances are also removed together with the alcohol and/or aroma substances are changed by the process (heat, atmospheric oxygen). A disadvantage of both methods is therefore the considerable change to the taste of the beverage.

Among the method of the second type, there are various technical, generally thermal methods with the help of which low-alcohol (>0.5% volume) or so-called alcohol-free beverages (<0.5% volume) are produced, with the aroma being simultaneously concentrated.

The best known of these methods for removing alcohol from beverages is easily distillation or rectification.

Extraction with liquids, with compressed or with supercritical gases, as well as reverse osmosis and dialysis are likewise known.

During the most common method, fractional distillation, the alcohol is removed as middle fraction from the alcoholic beverage in vacuo in a distillation column. The readily volatile aromas are preferably enriched in the top fraction, also called prerun, and the sparingly volatile aromas are enriched in the spent wash water. The alcohol is separated off with the middle fraction. The top fraction and the spent wash water are added again as aroma constituents to the dealcoholized beverage in the mixing. During the mixing, generally also certain permitted additives and fining agents are added to correct the taste. This method has two essential disadvantages: firstly, the aroma recovery is only incomplete for physical reasons (azeotropies of aroma constituents with alcohol, losses of readily volatile top notes via the vacuum pump system). Secondly, the alcoholic beverage as a whole is subjected to a thermal process which, despite lowering the process temperature by using a vacuum, leads to disadvantageous changes in the taste of the beverage. A recreation of the typical taste and odor components of the alcoholic starting product is thus not possible.

From the point of view of its principle, the spinning-cone method is likewise a fractional distillation method, but, as a consequence of its design, both reduces the thermal stress on the alcoholic beverage and improves the aroma recovery in the top notes. With regard to the sensory quality (taste and bouquet), this method has significantly improved the dealcoholized beverages compared to those obtained by means of conventional fractional distillation.

Irrespective of the method selected, however, it must nevertheless be noted that hitherto beverages in which the alcohol has been subsequently removed are unable to match up to the alcoholic starting products in terms of taste since, as already discussed briefly above, many aroma substances, in particular readily volatile aroma substances, are also removed with the removal of the alcohol. During a removal of the alcohol at elevated temperatures, moreover, oxidation processes and other chemical reactions are started or accelerated and these entail a further change to the taste. Elevated temperatures here are understood as meaning temperatures of the beverage of more than 30° C. since above these temperatures, depending on the beverage, the treatment time and the physicochemical processes, the composition of the beverage can change significantly. The shelf life and the color of the beverage can also be impaired by these methods.

In order to compensate for these disadvantages, alcohol-free or alcohol-reduced beverage intermediates obtained in this way are blended with batches of the non-dealcoholized beverage starting product, as a result of which the alcohol content of the end product increases again. Or else additives are mixed into the beverage intermediate that are intended to hide the change in taste, although this generally does not lead to the desired results.

Methods have now variously been proposed which attempt to counteract these effects by reducing the pressure or through extensive exclusion of oxygen during the dealcoholization. Examples of such methods are described e.g. in DE 35 06 820 A1 and DE 10 2010 031 729 A1.

DE 35 06 820 A1 describes a process in which sparkling wine is dealcoholized. For this, firstly the carbonic acid is removed from the sparkling wine in a closed system by spraying at low pressures (400-500 mm Hg), then a vacuum distillation is carried out at even lower pressures (80-120 mm Hg) and a temperature of 30° C. to 45° C., thus removing the alcohol, and then the carbonic acid is introduced again at 3 to 4 bar superatmospheric pressure and temperatures from 3° C. to 8° C. The sparkling wine dealcoholized in this way should comprise less than 0.5% by volume alcohol.

One example of a dealcoholization by means of gas is shown in DE 10 2010 031 729 A1. In the method described herein, ethanol is desorbed during the process from the beverage into the gas, which is then discharged and optionally subjected to further steps. In order to reduce the large amounts of gas usually required for this, DE 10 2010 031 729 A1 proposes carrying out the method at reduced ambient pressure. As a further effect, DE 10 2010 031 729 A1 describes how inert gas can also be used as gas under these conditions, which is said to prevent the changes in taste that otherwise arise on account of oxidation processes. The adjustment of the ambient pressure has to take place during this method in a controlled manner, where a pressure reduction during the dealcoholization is regulated in particular as a function of the boiling point of the beverage to be dealcoholized that is established, i.e. the pressure is reduced with progressing dealcoholization.

WO 2004/113489 A1 proposes a method in which the alcohol is likewise removed from the beverage by means of a distillation process. Prior to the step of alcohol removal, however, the beverage is separated by a permeation process into an alcohol-free phase, which is rich in aroma substances, and an alcohol-containing phase. The alcohol-containing phase is dealcoholized by means of distillation and then recombined with the alcohol-free and aroma-containing phase.

Despite the described measures, many aroma substances are still lost during the described methods, particularly during the alcohol removal.

SUMMARY

The invention described here aims to provide an improved device and an improved method for producing dealcoholized beverages, and in particular dealcoholized wine, in which more of the original aroma substances are still retained. Hereinbelow, the term dealcoholized beverages is used irrespective of whether they are low-alcohol (>0.5% by volume) or alcohol-free (<0.5% by volume). Wherever "alcohol-free" is used hereinbelow, then this is to be understood as meaning "largely alcohol-free", i.e. residual amounts of alcohol of up to about 0.5% by volume may still be present.

An improved method for producing dealcoholized beverages is disclosed in which in particular in some embodiments more of the original aroma substances are retained, a plant for carrying out such a method, and a beverage produced by the methods are disclosed herein. Embodiments of the method and of the plant are given in various additional embodiments, advantages, and examples discussed hereinafter.

A method for producing dealcoholized beverages comprises the following steps: a separation of the beverage starting product by means of non-thermal permeation into an alcohol-containing and aroma-containing permeate on the one hand and into an aroma-containing and alcohol-free retentate on the other hand, and a dealcoholization of the permeate, preferably by means of distillation, and combining of the dealcoholized permeate with the virtually alcohol-free retentate. Furthermore, during such a method, the aroma substances are removed from the aroma- and alcohol-containing permeate prior to removal of the alcohol and/or prior to distillation. This takes place preferably in an aroma adsorber. By removing the aroma substances, a largely dearomatized but alcohol-containing permeate on the one hand is obtained, from which the alcohol is then removed, resulting in a dearomatized, dealcoholized permeate/water phase. On the other hand, the adsorbed aromas are obtained in the form of an aroma phase. This aroma phase is combined with the permeate/water phase and the retentate and mixed to give the dealcoholized beverage end product.

The starting product used can be wine, sparkling wine, beer or spirits or any desired other alcohol-containing beverage which is to be dealcoholized.

The main objective of the permeation is the removal of the alcohol. The non-thermal permeation is carried out with the help of a nanofilter membrane (also simply called just membrane or nanofilter). On the filtrate side, the so-called permeate is formed during permeation; in the case of nanofiltration, this is termed the filtrate. For physical and chemical reasons, some of the water, aromas and water-soluble fruit constituents present in the alcoholic beverage also transfer to the permeate. The extract component of the alcoholic beverage is obtained by the aforementioned non-thermal permeation method with its substances of value, and separated as an independent component for a reconstitution. This extract component is referred to as "retentate". The reconstitution (also called reconstruction) takes place by mixing with further components in a mixing module.

The separation of the alcoholic beverage into an alcohol-containing and aroma-containing permeate on the one hand and an aroma-containing and virtually alcohol-free retentate on the other hand takes place by means of the non-thermal permeation under increased pressure, where the pressure is for example in a range from 10 bar to 50 bar and in particular in a range from 20 bar to 40 bar. During the non-thermal permeation, a membrane or a nanofilter (also called nanofilter membrane) is used as separating agent, which retains the retentate, but is permeable to the permeate. The membrane or the nanofilter is selected depending on the properties of the alcohol-containing beverage starting product and the desired composition of permeate and retentate. The pressure and the temperature with which the beverage starting product is conveyed over the nanofilter membrane are selected depending on the properties of the selected nanofilter membrane and the desired composition of permeate and retentate.

New membranes and nanofilters are being continuously developed which have different properties compared to the properties known hitherto. The pressures and temperatures to be applied can also vary according to the new properties of these newly developed membranes.

In general, it can be stated that the nanofilter membrane retains larger molecules such as dyes and extract substances but also certain aroma constituents, which vary depending on the membrane material used, in the retentate. Consequently, the retentate aromas are for example composed more of large molecules which are either polar or cannot pass through the membrane on account of their size. These are, for example, fruit acids, phenolic constituents, as well as simple and higher sugars, proteins and natural dyes. Small molecules such as alcohol and water are allowed through into the permeate by the nanofilter membrane. Similarly, in part fruit acids as well as sometimes valuable bouquet aroma substances also transfer to the permeate.

Preference is given to selecting a nanofilter membrane with a filter quality which ensures a good compromise between retention of the extract and aroma substances with simultaneously good permeate performance (water/alcohol with a number of important aroma substances and fruit acids).

It is very advantageous if the permeation is carried out at room temperature, i.e. in a temperature range from approx. 18° C. to approx. 29° C. Higher temperatures are possible but may lead to impairment of the extract, the color and the aroma; lower temperatures can reduce the permeation performance. Technically a temperature range from 0° C. to 50° C. is possible by way of example.

For most combinations of beverage starting product and nanofilter membrane, a temperature of 25° C. ±1° C. has proven to be most suitable.

It is particularly advantageous if during the non-thermal permeation, the retentate or the beverage starting product is supplied to and conveyed away from the nanofilter membrane several times in a circulatory manner. The supplying can take place for example via a supply line and the conveying away can take place in each case via a recirculation exit.

The aroma substances are removed from the aroma- and alcohol-containing permeate resulting from the permeation before the alcohol is removed therefrom, for example in a distillation process or another appropriate method. For the removal of the aroma substances, a cold adsorption in the aroma adsorber is carried out, in which the aroma- and alcohol-containing permeate is passed over an aroma-adsorbing adsorbent or through such an adsorbent or through a porous adsorbent bed with such an adsorbent.

The dealcoholized permeate/water phase is used during the mixing advantageously as formulation constituent for the reconstruction of the alcohol-reduced beverage, and/or it is also returned to the permeation process as diluent, and specifically in particular to avoid an excessively high concentration of extract substances in the circulating retentate/beverage starting product if the permeation process proceeds as described above; and/or it is used in the recuperation process, especially if food-grade steam is required for the recuperation process (see below) for the production of the same. This is particularly advantageous since foreign-water additions not allowed under food law can be avoided in this way.

The adsorbent of the aroma adsorber is matched to the aromas to be expected. Advantageously, the adsorbent is correspondingly selected activated carbons or correspondingly selected resins. Depending on the aromas to be expected and the properties of the resin, it is possible to use one resin or a mixture of different resins as adsorbents.

The aroma substances from the adsorbent are then recovered in a recuperation process, in particular a steam recuperation, in the form of an aroma phase.

Should a taste correction be necessary despite the excellent recovery of aromas and the retention of the mostly taste-relevant components in their original form, then the dealcoholized beverage can be admixed during the mixing also with suitable, permitted additives of fruit juice concentrates and/or fruit acids and/or carbonic acid, and/or be treated with permitted wine fining agents.

The method is carried out particularly economically as a continuous method. However, the method can also naturally be carried out as a discontinuous method, so-called batch method, particularly if only relatively small amounts are to be incorporated. In such a case or for average amounts of alcohol-containing beverages to be incorporated, it may be economically useful if certain method steps of the method are carried out as batch processes and other method steps are carried out continuously.

A plant for producing a dealcoholized beverage from an alcohol-containing beverage starting product is typically provided with a permeation module for separating the alcohol-containing beverage starting product into an alcohol- and aroma-containing permeate and a virtually alcohol-free and aroma-containing retentate, a module for dealcoholization of the alcohol- and aroma-containing permeate and a mixing module for the mixing of retentate and dealcoholized permeate. Furthermore, for obtaining an aroma phase from the alcohol-containing and aroma-containing permeate, it has an aroma adsorber which is provided functionally between the permeation module and the module for the dealcoholization. Moreover, the aroma adsorber has a further functional connection for the transmission of the aroma phase to the mixing module, such that the aroma phase can be combined in the mixing module with a dealcoholized, dearomatized permeate/water phase from the module for the dealcoholization and the retentate from the permeation module.

The aroma adsorber for the adsorption of the aroma substances is advantageously provided with an adsorbent which is arranged in particular in through-flowable cartridges. In such a case, it is functionally connected to a recuperation module in such a way that the aroma substances can be recuperated from the adsorbent, and specifically preferably by means of steam generated in a steam generator.

BRIEF DESCRIPTION OF THE DRAWINGS

The method according to the invention and a plant according to the invention for carrying out the method are described in more detail below by reference to working examples shown in the figures. The descriptions are only exemplary and do not have a limiting effect.

Identical elements are referred to in the figures with the same reference numerals. The figures show purely diagrammatically.

DETAILED DESCRIPTION

The method and the plant for carrying out the method are constructed in modules. The module components can be arranged according to the particular technical conditions. In this connection, the technical conditions are determined by the beverage starting product to be processed and by the way in which the method is operated, namely whether it is carried out as a continuous method, partially continuous method or as a batch method.

Figure 1:
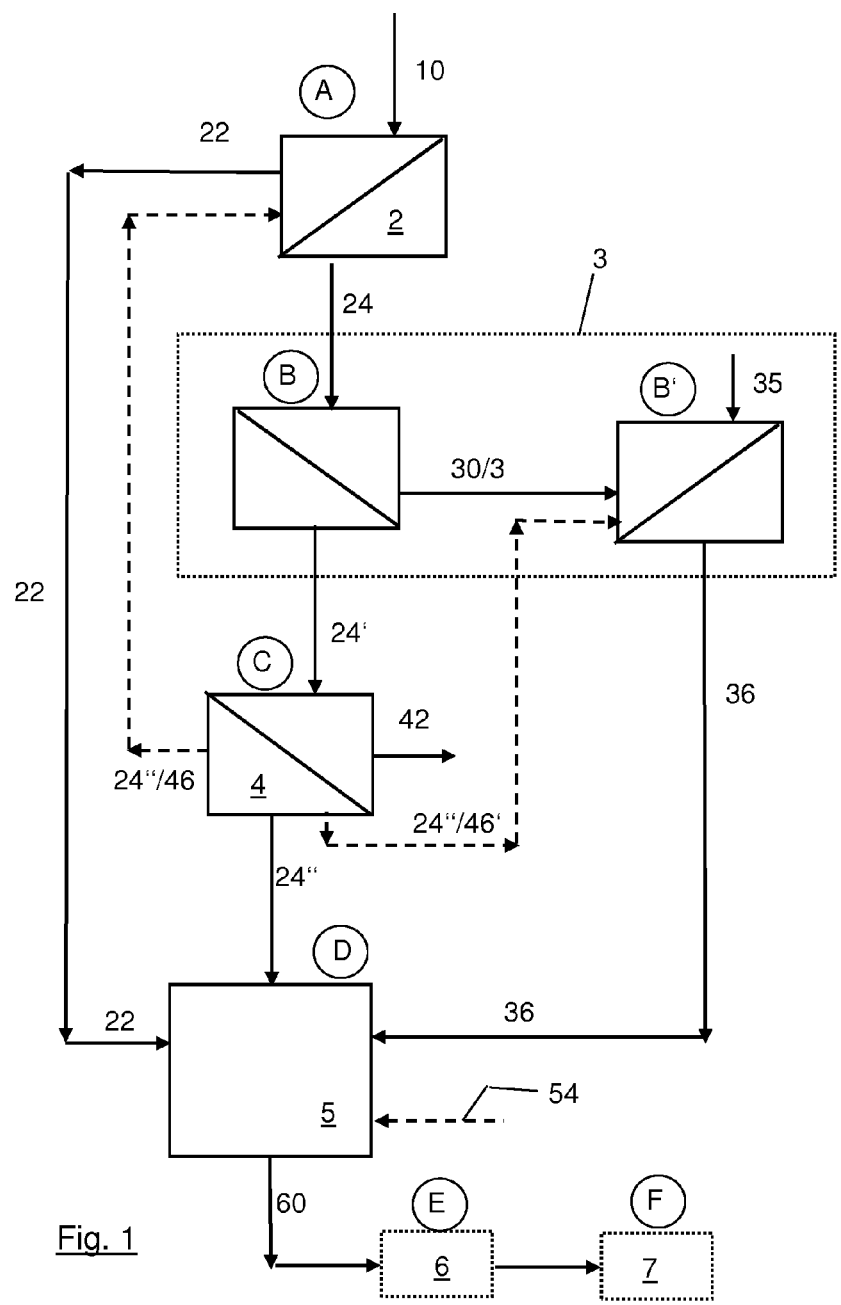
FIG. 1 a sketch representation of the method according to the invention.
Figure 2:
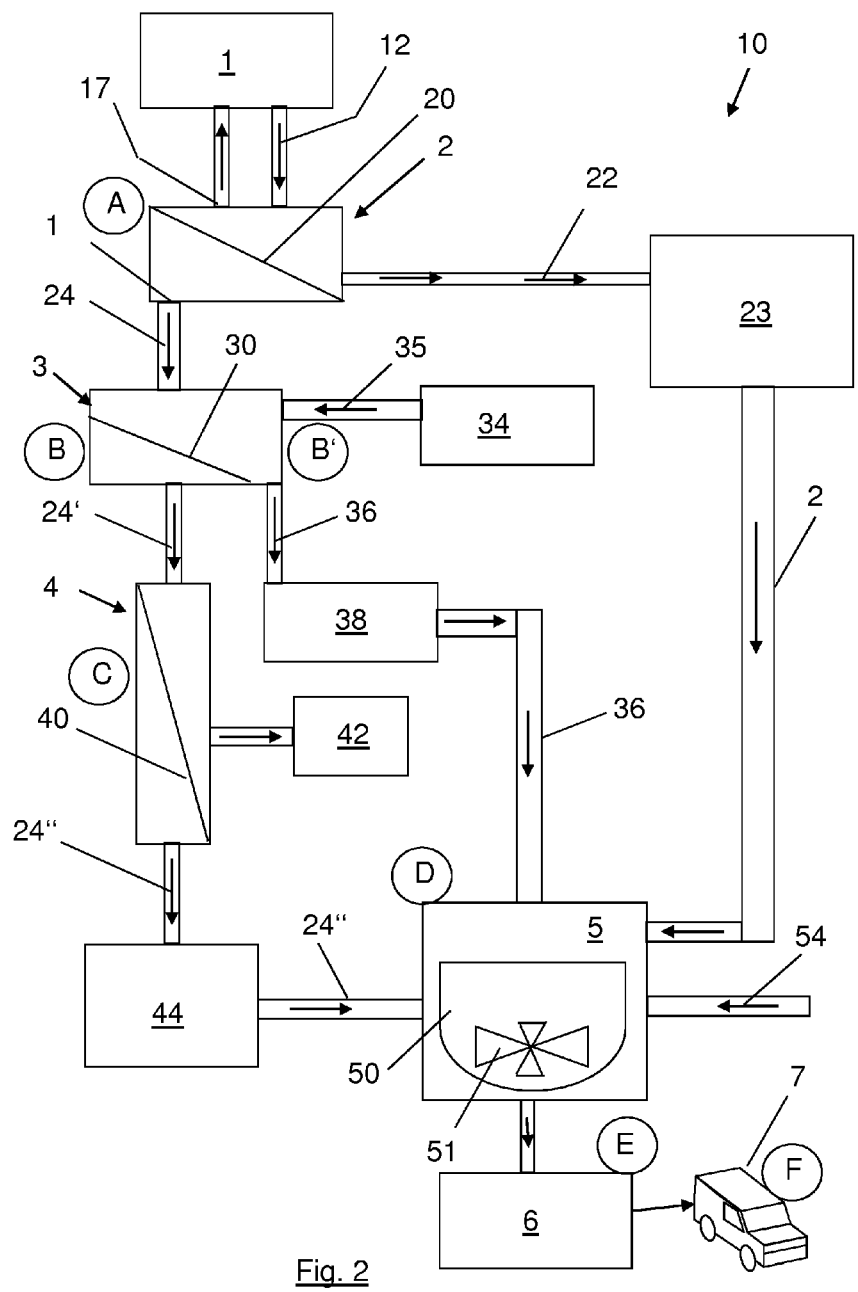
FIG. 2 a sketch representation of one possible embodiment of a plant according to the invention for producing a dealcoholized beverage by the method according to the invention.

The method according to the invention, carried out as a batch method, and one embodiment of a plant according to the invention for carrying out the method are described hereinbelow by reference to FIGS. 1 and 2. In the description of the plant, the explanation and description of regulating valves, inspection glasses, controls and other elements, the site and use thereof within the plant are familiar to the plant engineer, are deliberately omitted for the purpose of clarity. Similarly, set-up frameworks and the peripheral pipework are not shown.

The beverage starting product 10, in this example wine, is provided in a storage container 1 and supplied to a permeation module 2 via a supply line 12.

The permeation module 2 comprises a nanofilter membrane (for example Filmtec-NF90-400, manufacturer: Dow). With the help of a high-pressure pump (obtainable for example from HydraCell, Switzerland (not shown)), the beverage starting product 10 is conveyed over the nanofilter membrane 20 under an increased pressure of for example 30 bar. The pressure selected influences the through-flow performance, with the through-flow performance having an effect on the permeation performance and thus on the efficiency of the plant. Advantageously, the permeation A is carried out at room temperature in order to ensure a good permeation performance without harming the ingredients. The alcohol-containing beverage starting product 10 thus has a temperature of 18° C. to 29° C., preferably and in this example a temperature of 25° C. ±1° C., in this method step. The pressure selected for the permeation A, together with the selected temperature, influences the composition of retentate and permeate.

The nanofilter 20 is advantageously constructed in the form of a spiral. For this, the nanofilter has filter layers which are arranged in a spiral form and are held apart by spacers, which consist for example of plastic, and are fixed. The arrangement of the nanofilter 20 is advantageously selected such that the permeate 24 passes through the nanofilter 20 on the filtrate side and is discharged from the permeation module 2 under its intrinsic pressure. The permeation module 2 has at least two exits or discharge lines, namely a permeate exit 18 and a recirculation exit 17. The latter serves to achieve a high overflow rate of the nanofilter layers in the permeation module 2, and thus to prevent an accumulation of a filter cake or a local concentration of retained constituents. The alcohol-containing beverage starting product 10 is thus supplied to the permeation module 2 via the supply line 12, passed over its nanofilter 20, returned to the storage container 1 via the recirculation exit 17 and supplied via the supply line but this time to the permeation module 2 and so on, such that the beverage starting product 10 circulates over the filter layers of the nanofilter 20. Here, the substances retained by the nanofilter 20 become concentrated more and more in the beverage starting product 10 and the content of alcohol and aromas and other ingredients passing through the nanofilter 20 decreases. The beverage starting product 10 thus changes, with a decrease in volume, into the retentate 22.

In order to promote an efficient permeation process and in order to also protect the nanofilter membrane, for example against filter cake formation etc., "water" can or should be mixed into the circulating starting product/retentate. This "water" (supply 24"/46 shown dashed) originates preferably from the distillation process C, as described below, and is the aroma-free and alcohol-free permeate/water phase 24" accumulating as spent wash water. In this way, it is possible to work solely with the water present in the starting beverage and fresh water does not have to be supplied.

If the alcohol content has dropped to the desired value, and the circulating liquid of the beverage starting product is for example alcohol-free (alcohol content below 1% by volume) then this fraction of the beverage starting product is channeled as retentate 22 into a retentate buffer tank 23. In the case of wine, as in this example, the retentate is then about 75% concentrated compared to the beverage starting product, i.e. the substances present in the retentate 22 are present in the retentate 22 in a 4-times more concentrated form than in the beverage starting product 10.

Depending on the starting product, the limiting value up to which concentration can be carried out varies. Excessively high concentrations of certain substances in the retentate or in the circulating beverage starting product harbor the risk of sedimentation of ingredients, namely of fruit acids and/or their salts, which can lead to destruction of the nanofilter membranes. New generations of nanofilter membranes could naturally provide new possibilities in this connection.

In a continuous method (not shown here), the beverage starting product would be supplied continuously and not from a storage container. Instead of allowing the beverage starting product to circulate over a nanofilter membrane until it is present as retentate with desired concentration, many such nanofilter membranes would be arranged functionally one behind the other and the beverage starting product would be fed, with admixing of the permeate/water phase 24", over the cascade of nanofilter membranes until it exhibits, as retentate, the desired concentration of the substances retained by the nanofilter membranes.

As indicated above, the larger molecules such as dyes and extract substances, as well as large molecular weight or polar aroma substances remain in the resulting retentate 22. The permeate 24 produced as intermediate in this method step is a water-pale phase and comprises separated-off water, alcohol, and large parts of the volatile aroma substances which, depending on the membrane used, consists more likely of small and/or nonpolar molecules.

The permeate 24 is further conveyed to the aroma adsorber 3, which is connected functionally directly downstream to the permeation module 2. In the aroma adsorber 3, the aroma substances are removed from the alcohol-containing and aroma-containing permeate 24 in a particularly aroma-gentle cold adsorption B. The separation of the aromatic ingredients takes place—separately from the subsequent thermal treatment of the alcohol removal—by a non-thermal absorption method over an adsorbent 30 matched specifically to the aroma substances present in the permeate 24. Adsorbents 30 that have proven particularly useful are resins which are matched to the aroma substances of the alcohol-containing and aroma-containing permeate 24. The resin required for the aroma adsorption (in the example selected here with wine as starting product that is e.g. Macronet 200—manufacturer: Purolite) is provided in this example filled into aroma adsorber cartridges which are present in the form or arrangement of through-flowable adsorption beds.

If the alcohol-containing and aroma-containing permeate 24 flows over or through the adsorbent 30, then it removes the aroma substances from the permeate 24, which accordingly accumulate in the adsorbent 30. The passage of the permeate 24 for example through an adsorption column or else the over-flowing of an adsorbent takes place virtually without pressure. The pressure must only suffice to ensure a uniform, controlled through-flow or over-flow so that the aromas can accumulate. This results in a dearomatized, alcohol-containing permeate 24', which comprises essentially only more water, alcohol and fruit acids.

The dearomatized permeate 24' is either supplied directly to the distillation module 4, or is stored temporarily in a buffer container (not shown).

The aromas are removed from the adsorbent 30 by means of a recuperation method B'. In the example shown here, the recuperation method is a steam recuperation in which the recuperation B', i.e. recovery of the separated-off aromas takes place by means of the impacting of the adsorbent with food-purity steam 35.

To generate the steam, in this example an electric food steam generator 34 is used, the capacity of which is selected adapted to the required steam release and in this example has a capacity of 50 kg of steam per hour. The aromas are taken up by the steam 35, the aroma-containing steam is condensed and the resulting concentrated aqueous aroma fraction, which is referred to as aroma phase 36, is stored temporarily for example in a buffer container 38. The aroma phase 36 is produced, in the dealcoholization of wine described in this example, in amounts of about 3 to 30%, calculated on the basis of the amount of the original starting beverage and has, as essential constituents, water, aromatic constituents and small amounts of alcohol.

As regards the recuperation B' of the aromas by means of steam, it is to be noted that surprisingly the use of heat during the treatment of the aromas with the food-purity steam no longer harms the aromas following removal of the acidic extract.

As a result of the upstream removal of the aroma substances, the subsequent separation of the alcohol from the alcohol-containing but dearomatized permeate 24' is significantly simplified since the aromas that are sensitive with respect to heat, oxygen and volatility no longer have to be taken into consideration. The dearomatized, but still alcohol-containing permeate 24' is therefore separated from its alcohol by a simple fractional distillation C. The distillation module 4 accordingly comprises a distillation column 40 for fractional distillation according to customary principles, working preferably in an energy-saving manner in vacuo.

For an alcohol-free end product, the distillation C is preferably operated such that a residual alcohol content of less than 0.1% by volume remains in the spent wash.

For this, the distillation plant 4 is provided with a distillation column 40 which advantageously has rectifying plates or corresponding internals but nevertheless can remain simple in structure since no further specific separation tasks are required (such as the aroma separation from the alcohol customary in the prior art). The alcohol is conveyed away from the distillation column 40 and collected in an alcohol collecting container 42. From there, it can be passed to its further determination, which is independent of the method described here and its product.

If no further economic exploitation of the alcohol is intended, and the diluted alcohol must be discharged into the public disposal network, the removal of the alcohol by means of a falling-stream evaporator is possible as an alternative to the distillation.

The now dearomatized and dealcoholized permeate, which is produced primarily as spent wash during the distillation C, is referred to as permeate/water phase 24" and can also comprise taste-relevant constituents, such as, for example, fruit acids. The permeate/water phase 24" is either, as shown here, stored temporarily in a collection container 44 or is passed directly to their further determinations. In the subsequent step of the dealcoholization method, which is referred to as mixing D, the permeate/water phase 24" is used for example for back-dilution. The permeate/water phase 24" is produced in excess, i.e. the total volume of permeate/water phase 24" produced is not required for the back-dilution in the "mixing" D method step. Remaining amounts are therefore used firstly for producing food-suitable steam 35 in the steam generator 34 (supply line 24"/46' shown in FIG. 1 with a dashed line) and secondly for the continuous back-dilution of the retentate/beverage starting product circulating in permeation method A (supply line 24"/46 shown in FIG. 1 with a dashed line). This mode of operation ensures that only water from the exit beverage itself is used for the back-dilution and process control. During the production of dealcoholized wine, as shown in this example, the addition of foreign water is then limited to the back-dilution as intended of the grape juice possibly present as additive in the end formulation.

In the mixing module 5, which comprises a mixing container 50 with a mixing device 51, the retentate 22, the aroma phase 36 and the permeate/water phase 24' are combined and mixed for the reconstruction, also referred to as reconstitution, of the dealcoholized beverage 60. The mixing D advantageously takes place in suitable stainless-steel containers, as is customary in the beverage industry. A classic mixing method is used which permits a corresponding formulation according to the mixing of the dealcoholized beverage 60. For this, the aforementioned fractions, retentate 22, aroma phase 36 and permeate/water phase 24" are used from the part steps permeation A, adsorption B, alcohol separation/dealcoholization C. If necessary, further formulation constituents 54 are mixed in to correct the taste. Such further formulation constituents 54 are understood as meaning those additives and fining agents and processes which are also customary during the production of alcoholic beverages and are permitted under food law, such as the additions of fruit juice concentrates, fruit acids, carbonic acid or of other permitted wine fining agents. In order to expel for example harmful oxygen, the liquid combined in the mixing container is supplied with carbon dioxide. For this, only very little carbon dioxide is required, namely only amounts up to 6 g/liter, with in most cases just 1 g/l to 2 g/l sufficing, and also advantageously the installation of a $CO_2$ protective-gas cushion above the liquid in the mixing container 50. As stated, the intrinsic water produced in the process (spent wash-permeate/water phase from the distillation) is used for the mixing of the dealcoholized beverage 60. The addition of foreign water is added at most, if grape juice is added, for the back-dilution of grape juice concentrate to the point of its simple-juice concentration.

In a preferred embodiment of the method and/or the plant for carrying out the method, all of the method steps are monitored automatically and controlled with the help of an evaluation and calculation unit by means of a computer program.

Accordingly, there is a computer program product which is stored in a machine-readable carrier, or as computer data signal, embodied by an electromagnetic wave, with program code, is able to control the plant and/or carry out the method.

After finishing the beverage end product or ready-mixed dealcoholized beverage, it is filled into bottles or suitable storage packs (filling E) in a filling station 6 and then dispatched using suitable transport means 7 (dispatch F).

Figure 3:
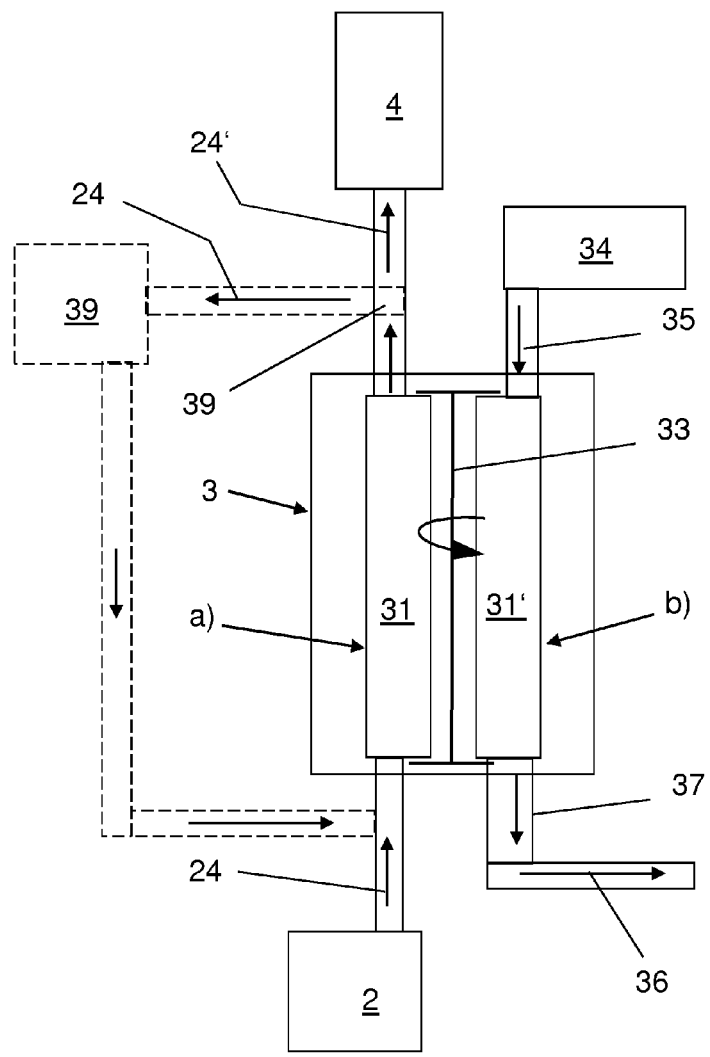
FIG. 3 a specific embodiment of an aroma adsorber as can be used in a plant according to the invention.

FIG. 3 shows a particular embodiment of an aroma adsorber 3. The aroma adsorber 3 is again attached directly to the permeation module 2. The adsorption material selected here is a mixture of different resins, which are filled in the form of small resin beads (diameter 0.05 mm to 1.5 mm, preferably 0.2 mm to 0.8 mm) distributed into two vertically arranged adsorbent containers in the form of stainless steel tubes 31, 31'. The diameter of the tubes is selected according to the desired throughput and in this example is in a range from 100 mm to 200 mm, preferably 150 mm. The tubes 31, 31' are equipped at the top and bottom with a stainless steel sieve which fixes the resin but allows the permeate 24 to pass through freely. The tubes configured in this way are called cartridges 31, 31' hereinbelow. They are used in each case singly, but usefully connected in parallel in order to ensure an adequate adsorption capacity. For the adsorption of the aromas, a virtually pressureless permeate stream flows through the cartridges. A flow rate of at most 5 to 6 bed volumes per hour and longitudinal meter of the cartridge is recommended, which for a 3-meter long cartridge would be 15 to 18 bed volumes. Bed volume is understood here as meaning the internal volume which the adsorbent has which, in the example presented here, consists of many small adsorption particles (preferably small beads)—with small here meaning a particle size or a diameter of about 0.05 mm to 2 mm. The same with respect to bed volume also applies for adsorbents made from a porous material with end-to-end pores, such as e.g. activated carbon.

The dearomatization of the permeate 24 takes place during the passage of the permeate 24 through the resin packing in the cartridge. The permeate 24 is passed in each case from bottom to top through the cartridges, the resin mixture gradually becoming saturated from bottom to top with the aroma constituents. In the diagram shown, the permeate 24 in each case flows from bottom to top through the cartridge on the left-hand side in position a). The dearomatized, alcohol-containing permeate 24' is further conveyed to the distillation module 4.

Depending on the aroma loading of the beverage starting product 10 and the corresponding aroma content of the permeate 24, it is possible to achieve a complete saturation of the cartridge content, and aroma breakthrough may result, i.e. on the exit side of the cartridge at position a) the permeate 24 may still comprise aroma substances, although this is undesirable. In order to recognize aroma breakthrough in good time, the content of aroma substances on the exit side of the cartridge at position a) is monitored in a monitoring station 39. The monitoring at the monitoring station 39 can be carried out by a trained operator in a sensory manner, e.g. on the basis of the color, the taste or odor of the emerging permeate, although it may also for example take place by means of a conductivity measurement. In the event of an aroma breakthrough, operation is switched to a fresh cartridge connected in parallel. This means the aroma-saturated cartridge of position a) is exchanged for a fresh, "aroma-free" cartridge which has hitherto been located at a parallel position b).

In the example shown, this exchange from position a) to position b) is facilitated by a rotary mechanism 33. However, lateral displacement mechanisms may also be provided or, instead of changing the position of the cartridges, the connections and/or the feed and discharge lines to and from the cartridges can be swapped. During the replacement of the cartridges or else in the case of interim cases if it is not possible for example to replace the aroma-saturated cartridge with an aroma-free cartridge quickly, the stream with still aroma-containing permeate can then be diverted to the monitoring station 39 of the permeation module 2 and e.g. stored in a buffer tank 32 and optionally conveyed later through a fresh cartridge (indicated by dashed line).

In the example depicted, the cartridge 31' has become aroma-saturated and just swapped from position a) to position b) for a cartridge 31, such that now the fresh cartridge 31 with its resins removes the aromas from the permeate 24 at position a). The aroma-saturated cartridge 31' at position b) is simultaneously regenerated, i.e. food-purity steam 35 is passed through, with the previously adsorbed aroma being recovered in concentrated form and being discharged on the exit side following condensation to a cooler 37 as aroma phase 36.

It has proven to be very advantageous to pass the steam 35 in the reverse direction to the direction which the permeate 24 has previously taken through the cartridge,—namely from top to bottom.

EXAMPLE 1

The processing of for example 300-400 l of wine per hour requires a permeation module with a nanofilter membrane (for example Filmtec-NF90-400, from Dow, there being many other manufacturers and products), which has for example a membrane surface area of 70 $m^2$ to 120 $m^2$, and corresponding dimensioned receiving units, in particular receiving cylinders for these membranes, and pumps which supply the beverage starting product to the nanofilter membrane with a pressure of at least 10 bar, at most 50 bar and a corresponding flow capacity. For the desired processing a HydraCell P-35 pump with a capacity of 140 liters/minute, for example, would be suitable. Smaller liter capacities are unfavorable since they reduce the permeate output. Adsorption cartridges as described for example by reference to FIG. 3 are suitable for this processing objective if they have a diameter in the range from 100 mm to 200 mm and a length from about 1.5 to 2.5 meters. A suitable adsorbent is, as already mentioned, e.g. a resin of Purolite, sold under the name Macronet 200, there being many different manufacturers and products. To recover the aroma from the adsorption cartridges, a food steam generator with a capacity of 40 to 60 kg of steam per hour is suitable. Of suitability for separating off the alcohol by means of distillation is e.g. a distillation column made of stainless steel with a column diameter between 200 mm and 300 mm and a packing height in the region of 7 m to 10 m in 2 sections, and with two supporting shells, a liquid divider for a range from 20 l/h to 80 l/h and a corresponding liquid collector and distribution plate for a range from 0.5 $m^3$/h to −1.8 $m^3$/h. In addition, it requires corresponding regulating valves, inspection glasses and controls.

EXAMPLE 2

Composition of an alcohol-free red wine produced by the method according to the invention using a plant according to the invention, produced from a Pinot Noir: red wine retentate Pinot Noir: 280 g or 269 ml; red wine permeate/water phase from distillation (intrinsic water): 595 g or 589 ml; red wind aroma phase: 100 g or 99 ml; red wine fruit juice concentrate 6-fold concentrated: 55 g or 41 ml; remainder*: further formulation constituents and foreign water. Acid content: 4 g/l; $CO_2$ content: 2 g/l; alcohol content: <0.5% by volume. * The remainder results as volume difference from 1 liter minus the specified constituents in ml.

EXAMPLE 3

Composition of an alcohol-free white wine produced by the method according to the invention using a plant according to the invention, produced from a Cuvée blanc 2009, barrel: white wine retentate Cuvée blanc: 250 g or 245 ml; white wine permeate/water phase from distillation (intrinsic water): 560 g or 559 ml; white wine aroma phase: 150 g or 99 ml; white wine fruit juice concentrate 6-fold concentrated: 60 g or 45 ml; remainder*: further formulation constituents and foreign water. Acid content: 6 g/l; $CO_2$ content: 2 g/l; alcohol content: <0.5% by volume. * The remainder results as volume difference from 1 liter minus the specified constituents in ml.

As is evident from these examples, the substances obtained by means of the method from the original beverage starting product (10)—aroma phase (36), permeate/water phase (24") and retentate (22)—make up the majority of the dealcoholized beverage end product. In the aforementioned examples, the remainder added for reasons of taste, which is added during the mixing (D) of the dealcoholized beverage (60) in the form of further formulation constituents (54) to the mixture of aroma phase (36), permeate/water phase (24") and retentate (22), is less than 5% by volume of the dealcoholized beverage (60), namely in one case 4.3% by volume and in one case 4.8% by volume. In general, it can be stated that in this method the remainder of further formulation constituents (54) that is added to optimize the taste is below 10% by volume and in particular below 6% by volume, often even below 4% by volume, based on the dealcoholized beverage (60).

In summary, it can thus be stated that the constituents of the beverage starting product that are value-determining both sensorally and beverage-typically, are synthesized technically separated as fractions, namely as retentate, aroma phase and as permeate/water phase, in order to be able to be later advantageously recombined again. The novelty according to the invention lies firstly in the obtaining of the unimpaired sensitive sensoric ingredients by non-thermal method steps, namely dealcoholization of the alcoholic beverage by means of permeation and immediate subsequent separation of the aromas by cold adsorption, and secondly, resulting therefrom, in a simplification of the alcohol separation in a noncritical e.g. also thermal process (distillation)

and a simple isolation resulting therefrom of a non-sensitive fraction, namely the permeate/water phase. The permeate/water phase, which consists primarily of water, but can also comprise fruit acids important for the original taste, is combined and mixed, as formulation constituent for the reconstruction of the dealcoholized beverage at the end of the method according to the mixing formulation, with the other fractions, namely the retentate, the aroma phase and if necessary further formulation constituents in the mixing module 5.

As explained above, it is possible with the method according to the invention to produce an alcohol-free beverage and in particular an alcohol-free wine or alcohol-free beer having all of the attributes which the corresponding normal alcohol-containing beverage and in particular a normally pressed wine has. The specific claim of the method lies in the obtaining of the typical odor (bouquet) and taste of the starting product, and indeed in an extremely high, hitherto unachievable quality. This is made possible by separating off the majority of the aromas by means of nanofiltration from the alcohol-containing fraction in a retentate and subsequent separating-off of the aromas still present in the alcohol-containing fraction (called permeate) by means of a non-thermal aroma adsorption method, which is preferably carried out with the exclusion of atmospheric oxygen; by subsequent dealcoholization of the now largely aroma-free alcohol-containing fraction in a distillation method and recovery of the spent wash, and, following the non-thermal aroma adsorption, as complete recovery as possible of the aromas by steam expulsion from the adsorbent and subsequent combining of the aromas thus obtained with the aroma-containing retentate and the now alcohol-free permeate.

It is clear to the person skilled in the art that and in what way, within the scope of the protective range of the patent claims, the described embodiments and/or the details described by reference to the working examples can be usefully combined and put together and how this is to be realized industrially. For reasons of space, however, it is not possible to figuratively represent and/or describe in detail all possible and useful combinations.

What is claimed is:

1. A method for producing a dealcoholized beverage from its alcohol-containing beverage starting product, comprising the steps of:
    separating in a permeation module the beverage starting product into an alcohol-containing and aroma-containing permeate and into an aroma-containing and largely alcohol-free retentate by means of non-thermal permeation, wherein the non-thermal permeation is carried out by means of nanofiltration with the help of a nanofilter membrane and the resulting retentate comprises retentate aromas and wherein the resulting permeate comprises permeate aromas;
    removing in an aroma adsorber, prior to dealcoholization, permeate aroma substances from the alcohol-containing and aroma-containing permeate in a cold adsorption;
    obtaining the permeate aroma substances in the form of an aroma phase from the cold adsorption, wherein the remaining permeate resulting from the cold adsorption is an aroma-free but alcohol-containing permeate;
    dealcoholizing in a module for dealcoholization, the aroma-free but alcohol-containing permeate by removing, after the cold adsorption, alcohol by means of an alcohol separation from the aroma-free but alcohol-containing permeate, which results in an aqueous, largely dearomatized and dealcoholized permeate/water phase; and
    mixing the aroma phase comprising permeate aromas and the permeate/water phase and the aroma-containing and largely alcohol-free retentate comprising retentate aromas to produce the dealcoholized beverage,
    wherein:
        the aroma adsorber is provided functionally between the permeation module and the module for dealcoholization and directly downstream to the permeation module,
        the aroma adsorber for the adsorption of aroma substances has adsorbents, in through-flowable cartridges, which are present in the form or arrangement of through-flowable adsorption beds,
        the obtaining of the permeate aroma substances in the form of an aroma phase takes place in such a way that for the cold adsorption the aroma-containing and alcohol-containing permeate is passed over or through the aroma-adsorbing adsorbent,
        the aroma-adsorbing adsorbent includes a resin or a mixture of different resins, and the permeate aroma substances are recovered from the adsorbent in a recuperation process including a steam recuperation, in the form of the aroma phase,
        food-grade steam is used in the steam recuperation,
        the permeate/water phase is used in the recuperation process, for the generation of the food-grade steam for the recuperation process, and
        the food-grade steam is passed through the cartridges in a reverse direction to a direction in which the aroma- and alcohol-containing permeate is passed over or through the aroma-adsorbing adsorbent.

2. The method according to claim 1, wherein the dealcoholization or alcohol separation takes place from the aroma-free but alcohol-containing permeate by means of fractional distillation.

3. The method according to claim 1, further comprising selecting the adsorbent depending on the aromas to be adsorbed.

4. The method according to claim 1, wherein the nanofilter membrane is selected depending on the composition of the beverage starting product that is to be dealcoholized.

5. The method according to claim 1, wherein the non-thermal permeation is carried out in a pressure range from 10 bar to 50 bar or in a pressure range from 20 bar to 40 bar depending on the nature of the nanofilter membrane and the desired composition of permeate and retentate.

6. The method according to claim 1, wherein the non-thermal permeation is carried out at a temperature in the range from 0° C. to 50° C.

7. The method according to claim 1, wherein the non-thermal permeation is carried out at a temperature at 25° C.±1° C.

8. The method according to claim 1, wherein during the non-thermal permeation, the retentate or the beverage starting product is supplied several times in a circulatory manner to a nanofilter membrane via a supply line, conveyed away from the nanofilter membrane via a recirculation exit and supplied to the nanofilter membrane again.

9. The method according to claim 1, wherein:
    the permeate/water phase is used as formulation constituent for the reconstruction of the dealcoholized/alcohol-reduced beverage during the mixing; and/or is returned as diluent to the permeation process, for the dilution of a circulating retentate/beverage starting product if the permeation process proceeds.

10. The method according to claim 1, wherein to correct taste, the dealcoholized/alcohol-reduced beverage is admixed during the mixing with selected additives of fruit juice concentrates and/or fruit acids and/or carbonic acid and/or is treated with wine fining agents.

11. The method according to claim 1, wherein the method is carried out as a continuous method.

12. The method according to claim 1, wherein:
the method is carried out as a batch method; or
certain method steps of the method are carried out as a batch method and other method steps are carried out continuously.

13. The method according to claim 1, wherein the non-thermal permeation is carried out at a temperature in the range from 18° C. to 29° C.

14. The method according to claim 1, wherein the non-thermal permeation is carried out at a temperature in the range from 22° C. to 26° C.

* * * * *